(12) United States Patent
Paros

(10) Patent No.: US 9,645,267 B2
(45) Date of Patent: May 9, 2017

(54) TRIAXIAL ACCELEROMETER ASSEMBLY AND IN-SITU CALIBRATION METHOD FOR IMPROVED GEODETIC AND SEISMIC MEASUREMENTS

(71) Applicant: Quartz Seismic Sensors, Inc., Redmond, WA (US)

(72) Inventor: Jerome M. Paros, Kirkland, WA (US)

(73) Assignee: Quartz Seismic Sensors, Inc., Redmond, WA (US)

( * ) Notice: Subject to any disclaimer, the term of this patent is extended or adjusted under 35 U.S.C. 154(b) by 222 days.

(21) Appl. No.: 14/498,868

(22) Filed: Sep. 26, 2014

(65) Prior Publication Data

US 2016/0091620 A1    Mar. 31, 2016

(51) Int. Cl.
*G01V 1/18*     (2006.01)
*G01V 7/12*     (2006.01)
*G01P 21/00*    (2006.01)
*G01P 15/18*    (2013.01)

(52) U.S. Cl.
CPC ............... *G01V 1/18* (2013.01); *G01V 1/184* (2013.01); *G01V 1/185* (2013.01); *G01V 7/12* (2013.01); *G01P 15/18* (2013.01); *G01P 21/00* (2013.01)

(58) Field of Classification Search
CPC . G01V 1/18; G01V 1/185; G01V 7/12; G01P 15/02; G01P 21/00
USPC ......................................................... 73/1.39
See application file for complete search history.

(56) References Cited

U.S. PATENT DOCUMENTS

| 3,474,672 A | 10/1969 | Lacoste et al. |
| 3,630,086 A | 12/1971 | Wilk |
| 4,445,371 A | 5/1984 | Lautzenhiser |
| 4,457,077 A | 7/1984 | Lautzenhiser |
| 4,457,168 A | 7/1984 | Lautzenhiser et al. |
| 4,479,385 A | 10/1984 | Koehler |
| 4,517,841 A | 5/1985 | Peters et al. |
| 5,112,126 A | 5/1992 | Graebner |

(Continued)

OTHER PUBLICATIONS

Lacoste, et al., "Lacoste and Romberg Stabilized Shipboard Gravity Meter", Geophysics, col. 32, No. 1, Feb. 1967, pp. 99-109.

(Continued)

*Primary Examiner* — Walter L Lindsay, Jr.
*Assistant Examiner* — Ruth Labombard
(74) *Attorney, Agent, or Firm* — Dorsey & Whitney LLP

(57) ABSTRACT

A device and method for improved geodetic and seismic measurements are disclosed. The device comprises a triaxial accelerometer assembly, mounted to a reference structure, having full scale ranges greater than +/−1 G on three orthogonal axes and a mechanism for rotating the triaxial accelerometer assembly on the reference structure. The triaxial acceleration assembly is calibrated with an internal alignment matrix such that measurements of Earth's gravity vector are rotationally invariant with respect to the direction of Earth's 1 G static gravity vector irrespective of the orientation of the triaxial assembly on the reference structure. In-situ calibrations are performed by rotating the axes of the triaxial acceleration assembly in the direction of Earth's static gravity vector. Drift of the triaxial accelerometer assembly is compensated for by measuring changes in the values of the invariant static gravity vector for each axis and correcting for the drift with new calibration coefficients.

20 Claims, 5 Drawing Sheets

(56) References Cited

U.S. PATENT DOCUMENTS

| | | | |
|---|---|---|---|
| 5,341,681 A | 8/1994 | Molny et al. |
| 5,461,914 A | 10/1995 | Zumberge et al. |
| 5,606,124 A | 2/1997 | Doyle et al. |
| 5,728,935 A | 3/1998 | Czompo |
| 5,970,787 A | 10/1999 | Wignall |
| 6,518,756 B1 | 2/2003 | Morys et al. |
| 6,590,536 B1 | 7/2003 | Walton |
| 6,615,660 B1 | 9/2003 | Feinberg et al. |
| 6,776,035 B2 | 8/2004 | Wijeyesekera et al. |
| 6,826,960 B2 | 12/2004 | Schaad et al. |
| 7,178,401 B2 | 2/2007 | Byrd |
| 7,437,255 B2 | 10/2008 | Woodmansee et al. |
| 8,099,994 B2 | 1/2012 | Stachow et al. |
| 8,616,054 B2 | 12/2013 | Paros et al. |
| 8,789,415 B2 | 7/2014 | Van Kann |

OTHER PUBLICATIONS

Neumeyer, J et al., "Analysis of gravity field variations derived from Superconducting Gravimeter recordings, the GRACE satellite and hydrological models at selected European sites", Earth Planets Space, 60, 2008, pp. 505-518.

Paros, J et al., "Nano-Resolution Sensors for Disaster Warning Systems", EEE Conference Publishing, Oceans'12 MIS/IEEE, Yeosu, Korea, May 2012.

Paros, J et al., "Nano-resolution technology demonstrates promise for improved local tsunami warnings on the MARS project", IEEE Conference Publishing, Oceans'12 MTS/IEEE, Yeosu, Korea, May 2012.

TRIAXIAL ACCELEROMETER ASSEMBLY AND IN-SITU CALIBRATION METHOD FOR IMPROVED GEODETIC AND SEISMIC MEASUREMENTS

REFERENCES CITED

U.S. Patent Documents

U.S. Pat. No. 3,474,672 A October 1969 Lacoste et al
U.S. Pat. No. 3,630,086 A December 1971 Wilk
U.S. Pat. No. 4,445,371 A May 1984 Lautzenhiser
U.S. Pat. No. 4,457,077 A May 1984 Lautzenhiser
U.S. Pat. No. 4,457,168 A May 1984 Lautzenhiser et al.
U.S. Pat. No. 4,479,385 A October 1984 Koehler
U.S. Pat. No. 4,517,841 A May 1985 Peters et al.
U.S. Pat. No. 5,112,126 A May 1992 Graebner
U.S. Pat. No. 5,341,681 A August 1994 Molny
U.S. Pat. No. 5,461,914 A October 1995 Zumberge et al.
U.S. Pat. No. 5,606,124 A February 1997 Doyle et al.
U.S. Pat. No. 5,728,935 A March 1998 Czompo
U.S. Pat. No. 5,970,787 A October 1999 Wignall
U.S. Pat. No. 6,518,756 B1 February 2003 Morys et al.
U.S. Pat. No. 6,590,536 B1 July 2003 Walton
U.S. Pat. No. 6,615,660 B1 September 2003 Feinberg et al.
U.S. Pat. No. 6,776,035 B2 August 2004 Wijeyesekera et al.
U.S. Pat. No. 6,826,960 B2 December 2004 Schaad et al.
U.S. Pat. No. 7,178,401 B2 October 2007 Byrd
U.S. Pat. No. 8,616,054 B2 December 2013 Paros et al.
U.S. Pat. No. 8,789,415 B2 July 2014 Van Kann

OTHER PUBLICATIONS

J. Paros et al. "Nano-Resolution Sensors for Disaster Warning Systems", IEEE Conference Publishing, Oceans' 12 MTS/IEEE, Yeosu, Korea, May 2012.
J. Paros et al. "Nano-resolution technology demonstrates promise for improved local tsunami warnings on the MARS project", IEEE Conference Publishing, Oceans' 12 MTS/IEEE, Yeosu, Korea, May 2012.
Lacoste et al. "Lacoste and Romberg Stabilized Shipboard Gravity Meter", February 1967, Geophysics, Col. 32, No. 1, pp. 99-109.
J. Neumeyer et al. "Analysis of gravity field variations derived from Superconducting Gravimeter recordings, the GRACE satellite and hydrological models at selected European sites", 2008, Earth Planets Space, 60, 505-518.

TECHNICAL FIELD

The present invention provides a device and method for improved seismic and geodetic measurements. More particularly, the device includes a triaxial accelerometer assembly capable of measuring the components of Earth's 1 G static gravity vector on three orthogonal axes and a mechanism for rotating the triaxial accelerometer assembly to perform in-situ calibrations. The present invention is used to make improved surface, subsurface and submarine measurements of seismic events, geodetic measurements of earth movements such as tilt, subsidence and uplift, as well as in energy exploration and production.

BACKGROUND OF THE INVENTION

A variety of instruments and methods have been used to measure geophysical phenomena. Pressure sensors and seismic instruments are used in disaster warning systems as described in the referenced documents "Nano-Resolution Sensors For Disaster Warning Systems" and "Nano-resolution technology demonstrates promise for improved local tsunami warnings on the MARS project". Seismometers, gravimeters and tiltmeters are extensively used for geodetic measurements. Applications in energy exploration and production include instruments and methods for seismic refraction measurements, orientation modules for directional drilling, and characterizing hydrocarbon reservoirs through gravity measurements. Tilt measurements are useful for providing geodetic data on subsidence and uplift, whether due to natural earth movements or due to energy production. Hydrocarbon reservoirs may be characterized with surface and borehole gravity measurements.

Prior art devices generally use the direction of gravity as a vertical reference or "plumb line". Compass directions may be determined with devices oriented to Earth's magnetic poles. Gravimeters and vertical seismometers can be aligned to the plumb line to measure gravity and tiltmeters can measure the angular deflections of the plane perpendicular to the plumb line. Various techniques in the prior art are used to ensure alignment and/or characterize misalignments to the plumb line. These techniques include leveling, dynamic compensation and characterization using associated sensors such as tiltmeters.

The referenced document, "Lacoste and Romberg Stabilized Shipboard Gravity Meter", and U.S. Pat. No. 3,474,672 describe a leveling platform that maintains verticality between the gravity meter and the plumb line using gimbal mounting and servo loops. Leveling techniques are also used to maintain verticality of relative gravity meters as described in U.S. Pat. Nos. 4,445,371, 4,457,077, and 4,457,168. U.S. Pat. No. 5,461,914 describes an absolute gravity meter that also requires leveling. Gyroscopes are used to determine the gravity meter's spatial angle from verticality as described in U.S. Pat. No. 5,112,126. Tiltmeters and accelerometers are used in a servo leveling system to align to verticality as described in U.S. Pat. No. 5,970,787. U.S. Pat. No. 8,616,054 describes a seismic and gravity sensor in which the weight of an inertial mass is unloaded with a spring arrangement when exposed to, and aligned with, the force of the static gravity field.

U.S. Pat. No. 3,630,086 describes a dynamic compensation technique wherein differential gravity forces are balanced by induced centrifugal forces. U.S. Pat. No. 5,341,681 describes a dynamic compensation technique using rotating accelerometers to determine the in-line and cross-gravity components in a gradiometer. Dynamically rotating a tiltmeter and accelerometer assembly about the instrument axis can be used to determine the cross terms in an alignment matrix as described in U.S. Pat. No. 5,606,124. U.S. Pat. No. 5,728,935 describes a system of two force measuring assemblies and an independent measure of kinematic acceleration from a reference point such that differential measurements of gravity may be calculated. U.S. Pat. No. 6,518,756 describes an apparatus for determining the motion of a borehole tool from rotational dynamic measurements relative to the plumb line using accelerometers and magnetic induction sensors. U.S. Pat. No. 6,590,536 describes a body motion detection system that corrects body-mounted accelerometers for the effects of static gravity. Another dynamic compensation technique is described in U.S. Pat. No. 6,615,660 wherein the perturbations caused by the motion of a moving mass are used to compensate and correct the outputs of a gradiometer. U.S. Pat. No. 8,789,415 describes a gravity gradient measuring instrument using two dynamically rotating sensor masses to reduce the effects of common-mode aircraft accelerations.

U.S. Pat. No. 6,776,035 describes a subsurface gravity measuring device in which a gravity sensor and separate tiltmeters are calibrated initially with characterization coefficients and later rotated relative to the plumb line to derive recalibrated coefficients. Because the gravity sensor and tiltmeters have full scale ranges less than 1 G, the rotation angles used for recalibration are small and a rotationally invariant 1 G vector cannot be used as a reference.

There are many single axis accelerometers in the prior art that can be combined into a triaxial acceleration assembly. Inherently digital sensors that include vibratory structures whose resonant frequencies are functions of the applied accelerations are described in U.S. Pat. Nos. 4,467,651 and 4,479,385. A triaxial accelerometer with variable sensitivity is described in U.S. Pat. No. 7,178,401. U.S. Pat. No. 6,826,960 describes a triaxial acceleration sensor with an internal alignment matrix.

Traditional strong motion sensors do not have the sensitivity or stability to make good long-term geodetic measurements. Traditional broadband seismometers and tiltmeters operate over a small fraction of Earth's 1 G gravity vector and do not have the range to measure strong seismic events and have no absolute reference for long-term measurements. Thus there is a need for a device and in-situ calibration method for improved seismic and geodetic measurements.

SUMMARY OF THE INVENTION

The present invention provides a device and method for improved geodetic and seismic measurements. The device comprises a triaxial accelerometer assembly, mounted to a reference structure, having full scale ranges greater than +/−1 G on three orthogonal axes and a mechanism for rotating the triaxial accelerometer assembly on the reference structure. The triaxial acceleration assembly is calibrated with an internal alignment matrix such that measurements of Earth's gravity vector are rotationally invariant with respect to the direction of Earth's 1 G static gravity vector irrespective of the orientation of the triaxial assembly on the reference structure. In-situ calibrations are performed by rotating the axes of the triaxial acceleration assembly in the direction of Earth's 1 G static gravity vector. Drift of the triaxial accelerometer assembly is compensated for by measuring the changes in the values of the invariant static gravity vector for each axis and correcting for the drift with new calibration coefficients.

Measurements of Earth's gravity vector have been made and analyzed as reported in the Referenced Document "Analysis of gravity field variations derived from Superconducting Gravimeter recordings, the GRACE satellite and hydrological models at selected European sites". Long-term stability of the superconducting gravimeter measurements is approximately 3 micro-gals (3 nano-gs) per year. The present invention does not make gravity measurements at that level of precision. However, it measures Earth's 1 G gravity vector with a triaxial package of high-resolution accelerometers and uses the invariance of the gravity vector as a reference to compensate for the drift of the triaxial accelerometers.

DETAILED DESCRIPTION OF THE INVENTION

Figure 1A:
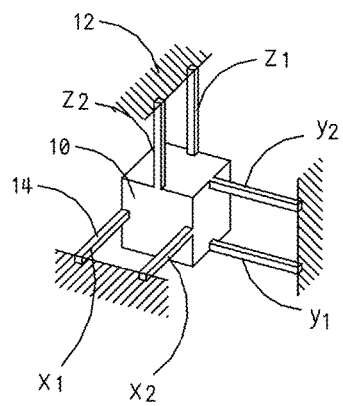
FIG. 1A depicts a prior art triaxial accelerometer.
Figure 1B:
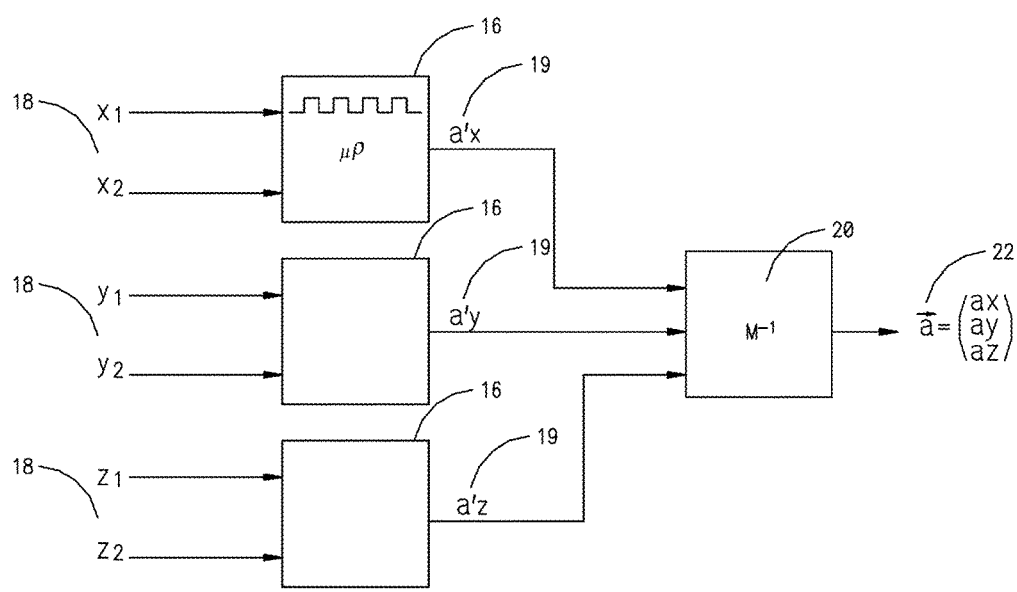
FIG. 1B depicts prior art processing electronics.

As described in U.S. Pat. No. 6,826,960, FIG. 1A depicts a prior art triaxial accelerometer. An inertial mass 10 is suspended from a base 12 in a statically determinate structure by force-sensitive resonators 14 to measure accelerations applied to the inertial mass 10 in three orthogonal directions X, Y and Z. FIG. 1B depicts a prior art electronics 16 that processes outputs 18 to determine the nominally orthogonal accelerations 19 (a'X, a'Y and a'Z). The inverse of the internal alignment matrix 20, determined by calibration, ensures that the outputs represent the applied accelerations 22, (aX, aY and aZ), along the true Cartesian coordinates. The initial calibration consists of rotating the triaxial accelerometer in Earth's gravity field to determine the alignment matrix but no means are provided to correct for the future drift of the triaxial accelerometer.

Figure 2:
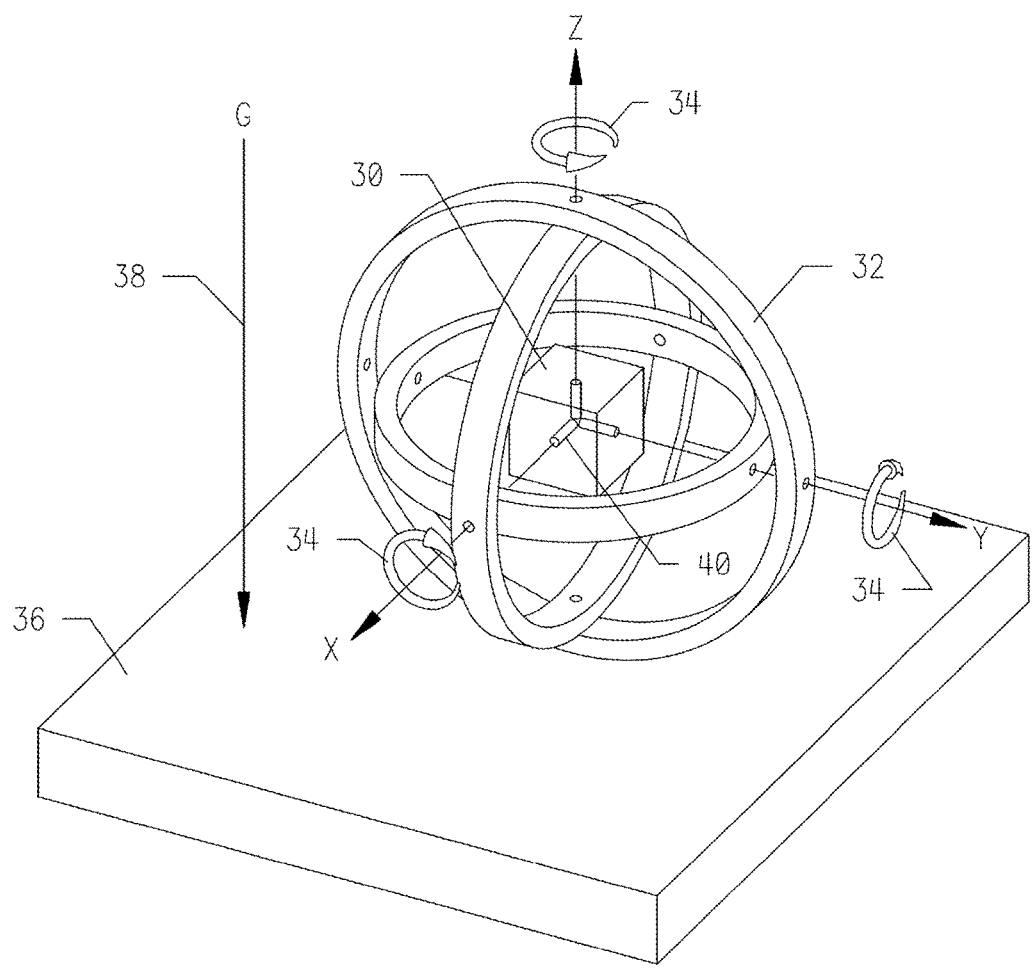
FIG. 2 is an isometric view of a triaxial accelerometer assembly capable of being rotated at continuous angles relative to a plumb line gravity vector.

FIG. 2 is an isometric view of triaxial accelerometer assembly 30 mounted in mechanism 32 that is coupled to the surface of a reference structure 36. Rotator mechanism 32 is capable of rotation about axes 34 on reference structure 36 relative to Earth's plumb line gravity vector 38. In some embodiments, the rotator mechanism 32 may be implemented using a gimbal, as illustrated in FIG. 2, however, other rotator mechanisms capable of rotation about axes 34 may be used. Acceleration sensors 40, having full-scale ranges greater than +/−1 G, are nominally aligned on orthogonal axes X, Y and Z of triaxial accelerometer assembly 30. An internal alignment matrix, determined by calibration, ensures that the outputs represent the applied accelerations along the true Cartesian coordinates of reference structure 36. The measured value of Earth's gravity vector 38 is calculated as the square root of the sum of the squares of the measured values of acceleration from the aligned 3 axes of the accelerometer assembly 30. These measurements are now rotationally invariant with respect to the plumb line direction irrespective of the orientation of triaxial assembly 30 on reference structure 36. Drift of acceleration sensors 40 is a major problem that can mask real signals such as tilting due to uplift or subsidence. Earth's plumb line gravity vector 38 can serve as an invariant reference value to which the measured values are compared. The drift of the triaxial accelerometer assembly 30 may be calculated as the difference between the vector measurement and the value of invariant gravity vector 38. However, the drift of the individual sensors 40 must be calculated to determine tilts of reference structure 36. Mechanism 32 can rotate triaxial accelerometer assembly 30 through known angles about axes 34 such that differing proportions of gravity vector 38 are measured on orthogonal axes X, Y and Z. For example, if successive rotations were to "substantially line up" the X, Y and Z axes with Earth's plumb line gravity vector 38, then the drift of the individual axes can be calculated as the difference between the vector measurement and the value of invariant gravity vector 38. As used herein, "substantially line up" can be within +/−5 degrees since the component of gravity vector 38 on an individual axis would be the cosine (5 degrees)=0.996 and the drift of an individual axis, calculated as the difference between the vector measurement and the value of invariant gravity vector 38 could be apportioned to 99.6%. A new set of calibration coefficients can be derived to compensate for the drift of acceleration sensors 40.

Figure 3:
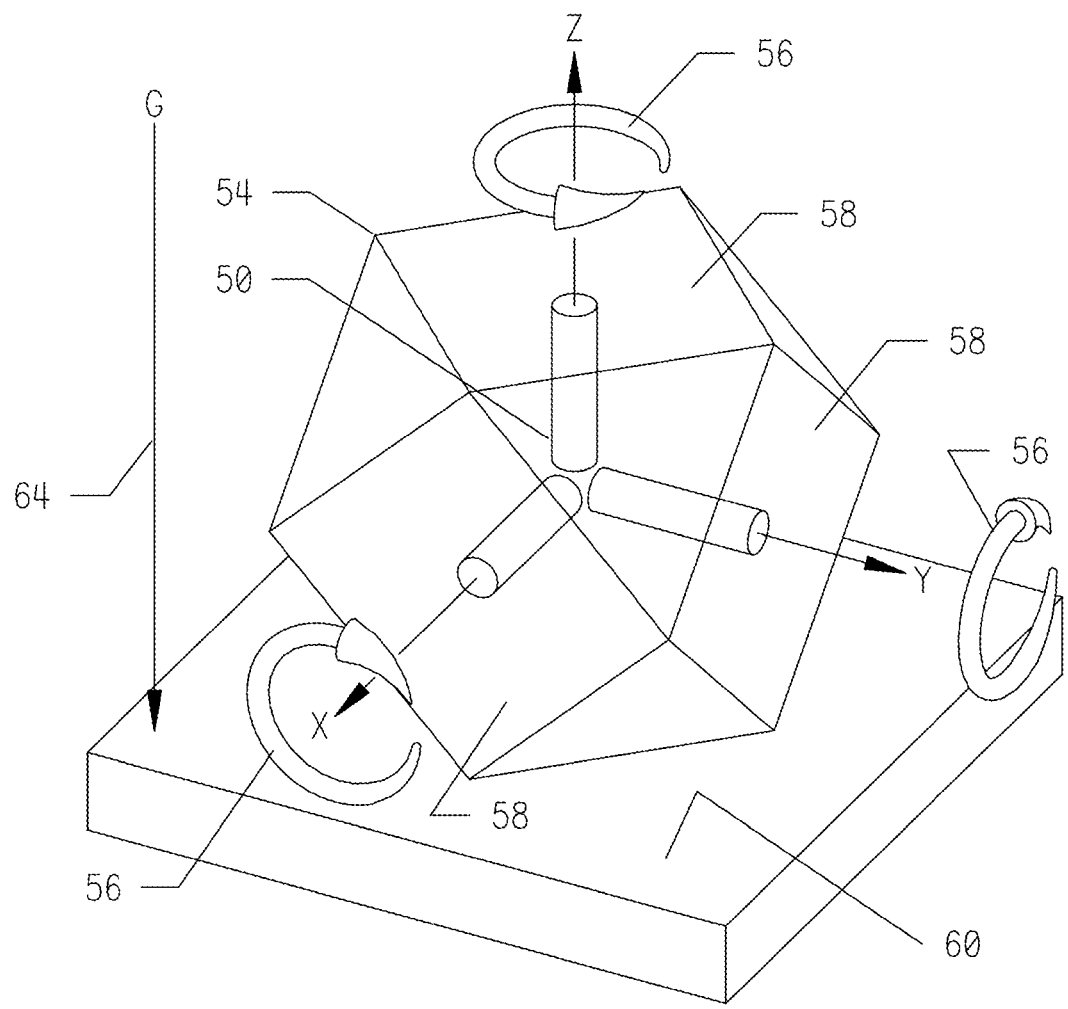
FIG. 3 is an isometric view of a triaxial accelerometer assembly mounted in a faceted housing capable of being rotated at fixed angles between the faceted faces and the direction of the plumb line gravity vector.

FIG. 3 is an isometric view of a triaxial accelerometer assembly 50 mounted in a faceted housing 54. Housing 54 can be rotated about axes 56 at fixed angles between the faceted faces and reference structure 60 relative to the direction of the plumb line gravity vector 64. For example, housing 54 can be rotated such that one of the faceted faces 58 can line up each one of the orthogonal axes 56 of triaxial accelerometer assembly 50 with the plumb line 64. As discussed previously, this technique allows the apportioning of the measured vector drift to individual axes 56.

Figure 4:
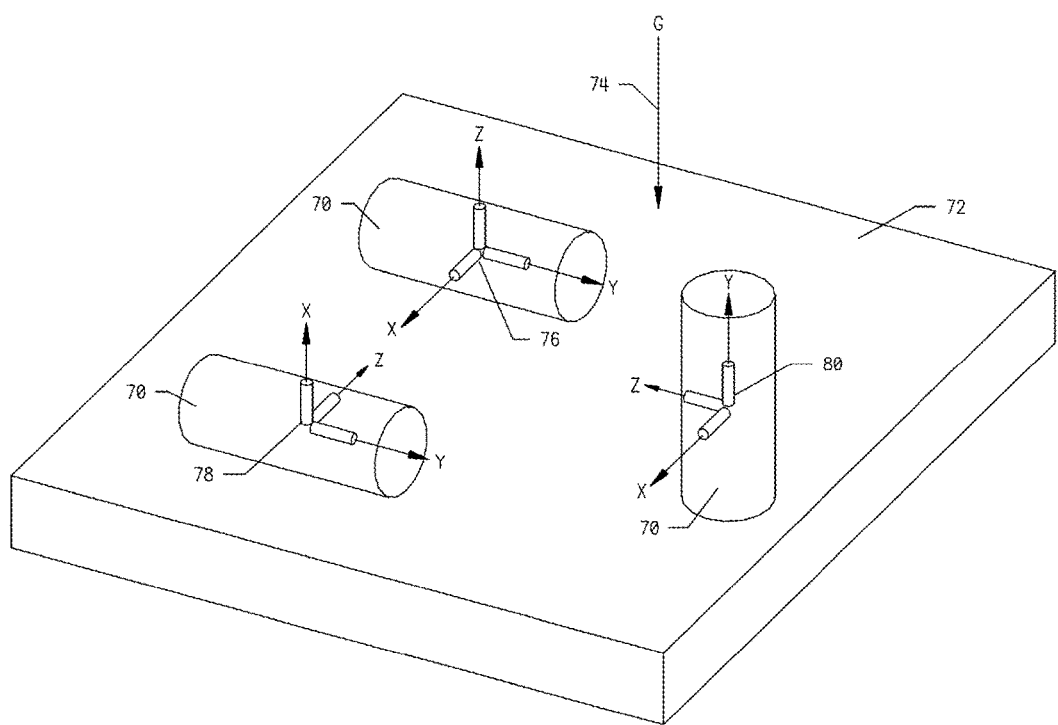
FIG. 4 is an isometric view of a triaxial accelerometer assembly capable of being rotated such that the accelerometer axes may be substantially aligned with the direction of the plumb line gravity vector.

FIG. 4 is an isometric view of a triaxial accelerometer assembly 70 capable of being rotated on reference structure 72 such that the accelerometer axes may be substantially aligned with the direction of the plumb line gravity vector 74. Orientation 76 of triaxial accelerometer assembly 70 substantially aligns the Z axis to plumb line 74. A 90 degrees rotation about the Y axis now substantially aligns the X axis with the direction of the plumb line gravity vector 74 as shown in orientation 78. Similarly, as shown in orientation 80, the Y axis may be substantially aligned with the direction of the plumb line gravity vector 74 by a −90 degrees rotation about the X axis from orientation 76.

Figure 5:
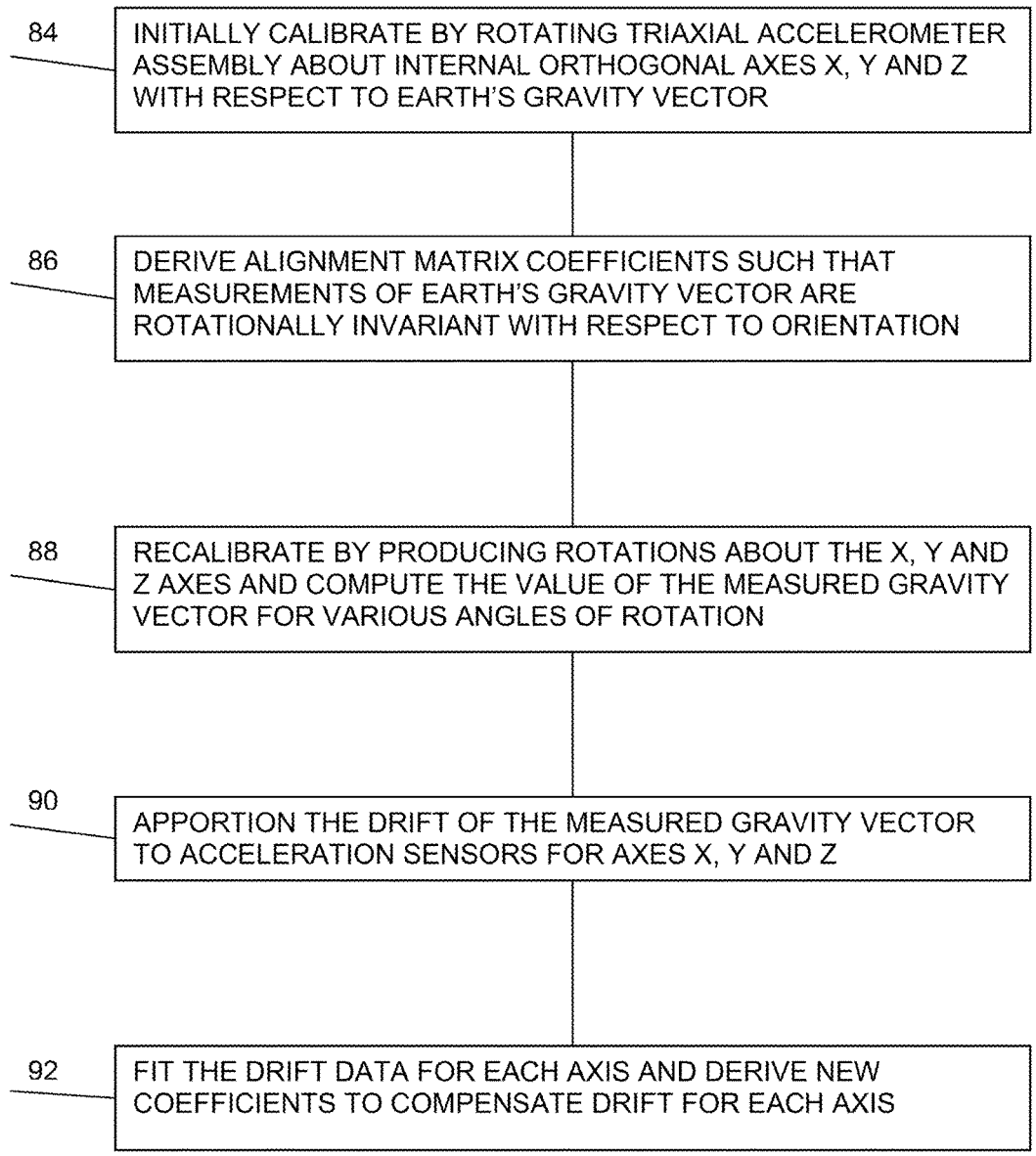
FIG. 5 is a block diagram of the process of in-situ calibration.

FIG. 5 is a block diagram of the process of in-situ calibration that can be employed to distinguish between the measurements of real signals and instrument drift. The drift may be calculated as the difference between the vector measurement and the value of the invariant gravity vector over time. An initial calibration 84 is performed and an alignment matrix 86 is computed (also refer to FIGS. 1A and 1B). Recalibrations 88 are performed by rotating the triaxial acceleration assembly in Earth's gravity field and computing the measured gravity vector for different orientations. A computation 90 is made to apportion the drift to each axis and the drift data is fit to derive new calibration coefficients 92. Thus the present invention and method are effective in compensating for instrument drift and can provide improved measurements of seismic and geodetic phenomena.

From the foregoing it will be appreciated that, although specific embodiments of the invention have been described herein for purposes of illustration, various modifications may be made without deviating from the spirit and scope of the invention. Accordingly, the invention is not limited except by the following claims.

What is claimed is:

1. An apparatus, comprising:
   a reference structure;
   a triaxial accelerometer assembly that measures acceleration on three orthogonal axes that includes a plurality of accelerometers, wherein the plurality of accelerometers each has a range greater than +/−1 G; and
   a rotator mechanism coupled to a surface of the reference structure and the triaxial accelerometer assembly, wherein the rotator mechanism is configured to rotate the triaxial accelerometer assembly about a plurality of axes relative to a plumb line gravity vector.

2. The apparatus of claim 1 further comprising a measurement device to determine the angles of rotation applied to the triaxial accelerometer assembly.

3. The apparatus of claim 1, wherein a housing containing the triaxial accelerometer assembly provides faceted faces at fixed orientations between the three orthogonal axes and the surface of the reference structure.

4. The apparatus of claim 3, wherein the faceted faces include plane faces perpendicular to the three orthogonal axes.

5. The apparatus of claim 1, wherein the triaxial accelerometer assembly is calibrated with an internal alignment matrix such that measurements of Earth's gravity vector are rotationally invariant with respect to the plumb line direction of Earth's 1 G static gravity vector irrespective of the orientation of the triaxial accelerometer assembly on the reference structure.

6. The apparatus of claim 5, wherein seismic signals are measured on three orthogonal axes in excess of the components of Earth's 1 G static gravity vector.

7. The apparatus of claim 5, wherein tilt signals are measured on the two orthogonal axes perpendicular to Earth's 1 G static gravity vector.

8. The apparatus of claim 1, wherein the plurality of accelerometers of the triaxial accelerometer assembly are vibratory structures whose resonant frequencies are a function of applied accelerations.

9. The apparatus of claim 1, wherein the reference structure is referenced to Cartesian coordinates.

10. A method of in-situ calibration of a triaxial accelerometer assembly, the method comprising:
    rotating a rotator mechanism coupled between a reference structure and the triaxial accelerometer assembly to vary an orientation of three orthogonal axes of the triaxial accelerometer assembly relative to a plumb line direction of Earth's 1 G static gravity vector, and
    measuring accelerations using a plurality of accelerometers of the triaxial accelerometer assembly, each of the accelerometers having a ran e greater than +/−1 G.

11. The method of claim 10, wherein rotating the rotator mechanism substantially lines up each orthogonal axis to the plumb line direction of Earth's 1 G static gravity vector.

12. The method of claim 10, wherein the accelerations measured include a value of the Earth's 1 G static gravity vector for each of the three orthogonal axes.

13. The method of claim 12, wherein a drift of the triaxial accelerometer assembly is compensated for by fitting changes in the values of the Earth's 1 G static gravity vector for each axis and correcting for the drift with new calibration coefficients.

14. The method of claim 13, wherein the new calibration coefficients are computed using a least squares regression fit.

15. The method of claim 13, wherein correcting for drift comprises computing a power series expansion function of time.

16. The method of claim 13, wherein correcting for drift comprises computing exponential plus linear functions of time.

17. The method of claim 13, wherein real signals are distinguished from the drift of the triaxial accelerometer assembly by comparing the changes in the values of the Earth's 1 G static gravity vector over time.

18. The method of claim 10, wherein the reference structure is referenced to Cartesian coordinates.

19. A method of in-situ calibration of a triaxial accelerometer assembly, the method comprising:

receiving measurements from a plurality of accelerometers of the triaxial accelerometer assembly, wherein the measurements include a value of the Earth's 1 G static gravity vector for each of the axes;

compensating for a drift of the triaxial accelerometer assembly by fitting changes in the values of the Earth's 1 G static gravity vector for each of the axes and correcting for the drift with new calibration coefficients; and comparing the changes in the values of the Earth's 1 G static gravity vector to distinguish real signals from the drift of the triaxial accelerometer assembly.

20. The method of claim 19, wherein the measurements are referenced to Cartesian coordinates.

* * * * *